J. W. MOAKLER.
SHAFT DRIVEN PIVOTAL HUB.
APPLICATION FILED AUG. 9, 1915.
1,268,866.
Patented June 11, 1918.
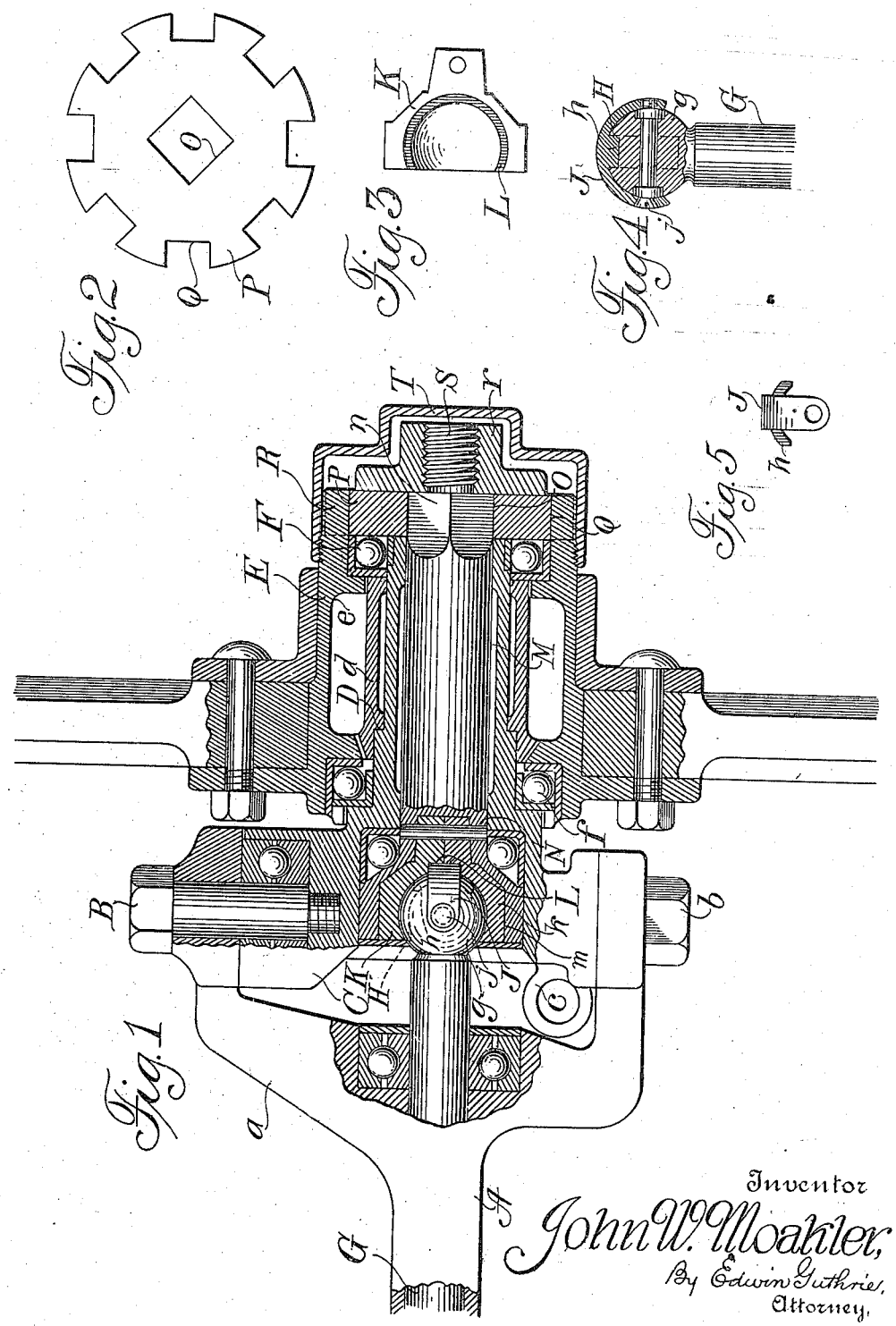
Inventor
John W. Moakler,
By Edwin Guthrie,
Attorney.

UNITED STATES PATENT OFFICE.

JOHN WM. MOAKLER, OF EAST WORCESTER, NEW YORK.

SHAFT-DRIVEN PIVOTAL HUB.

1,268,866.  Specification of Letters Patent.  Patented June 11, 1918.

Application filed August 9, 1915. Serial No. 44,460.

*To all whom it may concern:*

Be it known that I, JOHN W. MOAKLER, a citizen of the United States, residing at East Worcester, in the county of Otsego and State of New York, have invented certain new and useful Improvements in Shaft-Driven Pivotal Hubs, of which the following is a specification.

This invention relates to shaft-driven wheel hubs that are pivotally supported to swing in a horizontal plane, such as the front or steering wheels of motor vehicles, or either set of the wheels when both front and rear wheels are shaft-driven and arranged to be turned about a vertical axis to steer the vehicle.

The object of this invention is the production of a shaft-driven swinging hub for vehicle wheels having parts of special construction and arrangement with the view of affording extra strength, sufficient oil-carrying capacity, ready access to all wearing portions, and easy operation with a minimum of friction when in the hardest service.

Of the accompanying drawings setting forth the construction and arrangement of the various parts of this invention, Figure 1 represents a vertical section lengthwise of the axle and showing all the parts assembled. Fig. 2 is a flat face view of the slotted driving plate. Fig. 3 is an inside view of one of the shells of the ball or universal joint. Fig. 4 is a section of the ball of the universal joint showing the pivoted yoke astride of the ball and the lug in the slot of the ball. Fig. 5 is an end view of the yoke or spanner of the ball joint, and shows a side view of the lug or block that engages the curving recess or slot in the surface of the ball.

In the drawings and throughout the description, the same letter is used to refer to the same part.

Considering the drawings, the axle A is hollow, and it has a bifurcated or forked end $a$. By means of the pivot pins B and $b$ the axle box C has one end pivotally secured to the axle and may swing in a horizontal plane when the axle is in its customary horizontal position. The sleeve or socket $c$ is provided for the attachment of the steering rod usual in such connections.

In Fig. 1 it will be noted that the axle box C has an annular shoulder D, and that a sleeve $d$ encircling the axle box is constructed to engage the shoulder D. The sleeve $d$ may thus be moved lengthwise to the right on the axle box but is held by the axle box shoulder D from movement in the other direction.

Encircling the axle box and the sleeve $d$ is the hub E, and it will be observed that the hub has an internal annular recess $e$ that opens upon the sleeve $d$. Ordinarily, the sleeve is somewhat recessed correspondingly, and a chamber of considerable size and extent is thus formed for the reception of suitable lubricant that finds its way to the other parts, especially to the bearings F and $f$ which are arranged at the ends of the sleeve $d$.

Within the hollow axle A is the driven shaft G, having a ball $g$ at its end. The ball $g$ is a member of a universal joint, and is has a transverse, superficial groove H, in which movably fits the curved lug or block $h$ that forms an integral part of the curved yoke or spanner J that is pivotally secured to the ball $g$ by the diametrical bolt $j$. It will be seen that the yoke J projects beyond the ball, and when the twin shells K and $k$ are placed together to form a socket for the ball, they also form a curved recess or path L occupied and traveled by the projecting portion of the yoke J.

The journal M passes through the axle box C and is revoluble therein. At one end it is enlarged and constructed with a cavity or seat $m$ into which the twin shells K and $k$ fit. A pin N passing through the shells and through the journal M secures the shells within the cavity $m$ and upon and about the ball end $g$ of the shaft G. It is believed to be clear, therefore, that the revolution of the shaft turns the journal M similarly.

What may be termed the outer end of the journal is designated by the letter $n$, and it is squared as shown to engage a square opening O in a driving plate P that has a number of spaced peripheral slots Q. To engage the slots of the driving plate, the hub E has a like number of projections or lugs R. An axle nut $r$ clamps the driving plate P upon the journal M by engagement with the threaded extremity S of the journal, and the dust cap T, having a threaded connection with the hub E, covers the end of the hub together with the axle nut and driving plate. The plate P drives the hub E.

In operation, the shaft G drives the journal M, which by reason of the ball-and-socket joint described may swing horizontally through a wide angle. The bearings F and f support the hub E upon the axle box C, and the bearings are arranged next the ends of the sleeve d. Side thrust upon the hub is thrown partly upon the bearing F and is taken up by the engagement of the sleeve and the shoulder D. No one of the bearings receives the entire side thrust or jar in either direction. The wheel hub, bearings and sleeve are easily removed for any attention by detaching the dust cap and axle nut, and any worn or broken member may be readily replaced by a new one.

Having now described this invention and explained the mode of its operation, what I claim is:—

In a shaft driven pivotal hub, the combination with a journal having an enlarged portion at one end provided with a cavity, of a driving shaft, means for connecting the said journal and shaft comprising a universal joint having an outer portion formed to fit the said cavity in the journal and secured therein, an axlebox mounted upon the journal, the said journal being revoluble in the axlebox, the said axlebox being provided with a cavity at one end and the said enlarged portion of the journal being formed to movably fit the said cavity in the axlebox, a revoluble hub mounted upon the axlebox, and means secured to the outer end of the journal and constructed to transmit the rotation of the journal to the hub and to hold the hub in place upon the axlebox.

In testimony whereof I affix my signature.

JOHN WM. MOAKLER.